United States Patent
Golgiri et al.

(10) Patent No.: US 11,173,798 B2
(45) Date of Patent: Nov. 16, 2021

(54) SYSTEMS AND METHODS FOR VEHICLE WIRELESS CHARGING

(71) Applicant: Ford Global Technologies, LLC, Dearborn, MI (US)

(72) Inventors: Hamid M. Golgiri, Dearborn, MI (US); Anthony Melatti, Dearborn, MI (US); Danielle Rosenblatt, Dearborn, MI (US); Patrick Lawrence Jackson Van Hoecke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 15/894,771

(22) Filed: Feb. 12, 2018

(65) Prior Publication Data
US 2019/0248245 A1    Aug. 15, 2019

(51) Int. Cl.
*H02J 7/00* (2006.01)
*B60L 53/38* (2019.01)
*H02J 50/10* (2016.01)
*H02J 7/02* (2016.01)
*B60L 53/60* (2019.01)

(52) U.S. Cl.
CPC ............... *B60L 53/38* (2019.02); *B60L 53/60* (2019.02); *H02J 7/025* (2013.01); *H02J 50/10* (2016.02)

(58) Field of Classification Search
USPC ........................................................ 320/108
See application file for complete search history.

(56) References Cited

U.S. PATENT DOCUMENTS

| | | | |
|---|---|---|---|
| 2011/0021243 A1* | 1/2011 | Shin | H04W 4/029 455/550.1 |
| 2011/0025267 A1* | 2/2011 | Kamen | H02J 7/342 320/109 |
| 2012/0109409 A1* | 5/2012 | Hara | B60L 11/1824 701/1 |
| 2013/0241476 A1* | 9/2013 | Okada | H02J 50/40 320/108 |
| 2013/0249682 A1 | 9/2013 | Van Wiemeersch et al. | |
| 2014/0021912 A1* | 1/2014 | Martin | B60L 58/12 320/109 |
| 2014/0139038 A1* | 5/2014 | Konno | H02J 7/025 307/104 |
| 2015/0061578 A1* | 3/2015 | Keeling | B60L 53/12 320/108 |
| 2015/0260835 A1* | 9/2015 | Widmer | G01S 13/04 342/27 |
| 2016/0001702 A1* | 1/2016 | Wright | B60Q 9/008 340/435 |

(Continued)

FOREIGN PATENT DOCUMENTS

DE    102014015577 A1    4/2015

*Primary Examiner* — Samuel Berhanu
(74) *Attorney, Agent, or Firm* — Frank Lollo; Eversheds Sutherland (US) LLP (57) ABSTRACT

Method and apparatus are disclosed for preventing damage to an object within a charging field of a wireless vehicle battery charger. An example vehicle includes a wireless vehicle battery charger having a charging field, a plurality of Bluetooth antennas, and a processor. The processor is configured to identify a location of an object using one or more of the plurality of Bluetooth antennas, and, responsive to determining that the object is within the charging field, disable the wireless vehicle battery charger.

14 Claims, 5 Drawing Sheets

(56) References Cited

U.S. PATENT DOCUMENTS

2016/0020634 A1\* 1/2016 Kanno ...................... H02J 7/04
                                                          320/108
2018/0167784 A1\* 6/2018 Sute ...................... H04W 4/023
2018/0342907 A1\* 11/2018 Dimke .................. B60L 53/122

\* cited by examiner

SYSTEMS AND METHODS FOR VEHICLE WIRELESS CHARGING

TECHNICAL FIELD

The present disclosure generally relates to electric and hybrid vehicles and, more specifically, methods and systems for wireless charging of the batteries of electric and hybrid vehicles.

BACKGROUND

Modern electric and hybrid vehicles must be charged routinely in order to function. Some vehicles may include the ability to charge the vehicle battery by plugging into a wall outlet, charging station, or other electrical power source. Some vehicles may also or alternatively include the ability to wirelessly charge the vehicle battery at a distance. Wireless charging may be done by positioning a charging element, charging pad, or other charging implement nearby the vehicle. The power may then be wirelessly transmitted to the vehicle battery in order to charge it.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for wirelessly charging a vehicle, and maintaining safety during the charging process. An example disclosed vehicle includes a wireless vehicle battery charger having a charging field, a plurality of Bluetooth antennas, and a processor. The processor is configured to identify a location of an object using one or more of the plurality of Bluetooth antennas, and, responsive to determining that the object is within the charging field, disable the wireless vehicle battery charger.

An example disclosed method includes identifying, by a processor of a vehicle comprising a wireless vehicle battery charger and a plurality of Bluetooth antennas, a location of an object using one or more of the plurality of Bluetooth antennas. The method also includes, responsive to determining that the object is within a charging field of the wireless vehicle battery charger, disabling the wireless vehicle battery charger.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, some vehicles may include the ability to wirelessly charge the vehicle battery. The vehicle may include a wireless charger on an underside of the vehicle, which may have a corresponding charging pad or plate that is placed on the ground. The vehicle may be driven over the charging pad, and power may be transferred wirelessly to the vehicle (e.g., via an inductive coupling). This may be particularly convenient in an owner's garage by allowing the owner to simply drive the vehicle into the garage, and charge the vehicle without needing to connect any physical wires.

One potential issue with wireless charging as described above is that foreign objects may enter a charging field of the wireless charger, and may interfere with the charging operation. Where the foreign object is a person or animal there are additional safety concerns about damage that may be caused to the person or animal. Metallic objects are particularly relevant because they may absorb energy during the wireless charging operation, and may emit heat which can cause issues or safety concerns.

Some wireless charging systems may include the ability to detect when a metallic object is within a charging field, for example based on the amount of energy transferred to the object. These systems may then shut off once the foreign object is detected, however by that point the object may have already absorbed a significant amount of energy and damage may have occurred.

With these issues in mind, example embodiments of the present disclosure may provide systems and methods that enable a vehicle to detect an object within the charging field, or predict that an object is likely to enter the charging field, and responsively take corrective action so that no damage occurs. This may be done via the use of one or more antennas of the vehicle. For instance, many vehicles include two or more antennas, used for communication with various devices and systems (e.g., key FOB, tire pressure sensors, road side infrastructure, Bluetooth connected devices, etc.).

In some embodiments, antennas may be used to detect the position or location of various objects nearby the vehicle, in order to turn off or prevent the wireless charging operation from taking place. Some objects may be paired with the vehicle, such as cell phones, tablets, Bluetooth enabled pet collars, key FOBs, smart devices, and other Bluetooth enabled devices. The location of these objects with respect to the vehicle may be determined based on the Bluetooth pairing of the device to the vehicle. The antennas may send and receive data used to determine the position of the object. Other objects may not be Bluetooth enabled. However the position of the antennas on the vehicle may enable the detection of the position of the objects none-the-less. The vehicle antennas may transmit and receive data between themselves, and determine the received signal strength of each signal. When a non-Bluetooth-enabled object is moved toward one or more antennas, reflections off the object may change the received signal strength values. By measuring the changes in signal strength, the position of the object may be determined. In some examples both techniques may be used. If the position of the object is within a charging field of the vehicle wireless charger, the vehicle may stop a charging operation in order to prevent energy being transmitted into the object.

Figure 1:
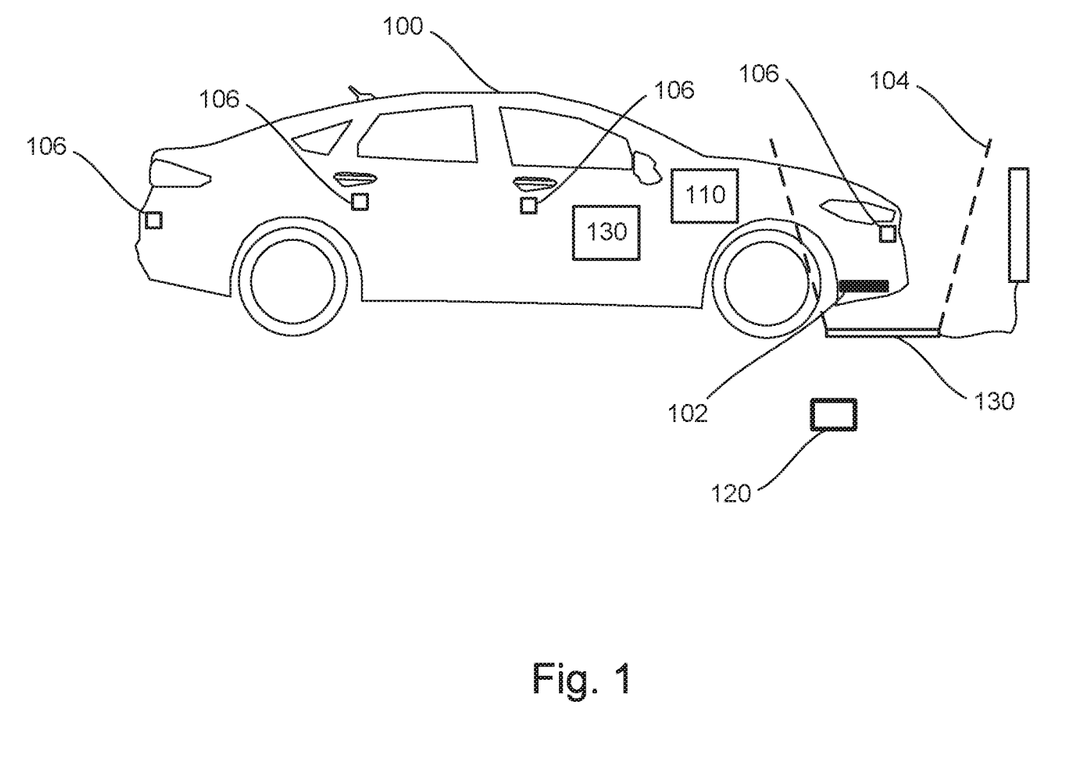
FIG. 1 illustrates an example vehicle according to embodiments of the present disclosure.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As show in FIG. 1, vehicle 100 may include a wireless vehicle battery charger 102, a plurality of antennas 106, a processor 110, and a communication system 130. One or more other electronic elements of vehicle 100 may be described in further detail with respect to FIG. 2.

Wireless vehicle battery charger 102 of vehicle 100 may be electrically coupled to a battery of vehicle 100. The battery may be a high voltage and/high capacity battery, used for vehicle traction and movement, as well as to power one or more other vehicle systems.

In some examples, the wireless vehicle battery charger 102, or simply charger 102, may be positioned on an outside of vehicle 100. As shown in FIG. 1, charger 102 is positioned on an underside of the vehicle toward a front of the vehicle. Other positions may include the side of the vehicle, the rear of the vehicle, and any other position on or in vehicle 100.

The charger 102 may include inductive element(s) (one or more coils) configured to receive energy from a charging pad or charging plate 130. The charging pad 130 may wirelessly transfer power to the vehicle battery via the charger 102.

In some examples, the charging pad 130 may be positioned on the ground, such as in a garage, in a parking spot or a parking garage, or in some other location where a vehicle is typically parked. Charging pad 130 may emit energy over a charging field 104. Metallic objects inside this field 104 may absorb energy, which can cause problems where the energy transfer to the object is not intended. This energy transfer can be exploited where the object in the field is charger 102, but where the object is a person, cell phone, keys, or other object, problems may arise.

In some examples, the charging field 104 may be associated or correspond to the charger 102 as well as the charging pad 130. The charger 102 may correspond to the charging pad 130 (e.g., they are paired, matched, or otherwise correspond to each other), and may have a charging field 104 in which the charger 102 must be positioned in order to charge the vehicle battery. As such, when a charger 102 is described herein as having a charging field, that may include the emitted field from a corresponding charging pad 130.

In some examples the charging field of the charger 102 may refer to an area around a charging pad 130 to which the charger 102 corresponds or is connected. For instance, if two charging pads are located in adjacent parking spots in a parking garage, a vehicle charger may have a charging field corresponding to the pad over which the vehicle is positioned, but may not correspond to the adjacent charging pad.

In some examples, the charger 102 may be operable within the charging field 104, wherein the charging field 104 is an area surrounding a given charging pad 130. The vehicle may be nearby several charging pads, but may be positioned above a single pad. The charging field in which the vehicle wireless battery charger 102 is operable is thus the field corresponding to the pad above which the vehicle is positioned.

In general, a charging field may correspond to the physical area around a given charging pad, wherein a charger placed within this physical area can receive energy and can charge. The charging filed may be directionally oriented, such that the charger 102 must be placed in a particular direction or orientation with respect to the pad 130 in order to receive power.

In some examples, a parking garage may include a plurality of charging stations next to each other, each having a charging plate or pad. This scenario is discussed in further detail with respect to FIG. 4.

Antennas 106 may be Bluetooth antennas, low frequency or high frequency antennas, used for GPS, radio, satellite, navigation, cell phone communication, infrastructure communication, and more. The antennas 106 may be positioned on an exterior or interior of vehicle 100, in one or more doors or door handles, in front or rear bumpers of the vehicle, on top of the vehicle, bottom of vehicle, or any other suitable location.

The antennas 106 may be used to pair with Bluetooth enabled devices, and may be used to determine a position of a paired Bluetooth device and/or object 120, which may or may not be a paired Bluetooth enabled device.

Processor 110 of vehicle 100 may be configured to carry out one or more actions or functions such as those described in herein. In some examples, processor 110 may be configured to determine the location of an object 120 near or proximate the vehicle charger 102, charging pad 130, and/or charging field 104. The location of the object 120 may be determined using one or more of the plurality of antennas. In some examples, object 120 may be a Bluetooth enabled object, such as a phone, tablet, smart device, etc. In these cases, the position of the object may be determined based on a paring with the vehicle.

In order to determine the location of the object 120 where it is a Bluetooth enable object, the object may be paired to the vehicle 100. The location of the object 120 relative to the vehicle 100 may be determined using triangulation and/or trilateration based on signals strengths of communication between the antennas 106 and the object 120. A stronger signal strength value at a first antenna than a second antenna may indicate that the object 120 is closer to the first antenna than the second antenna. This information can be used to determine the location of the object.

In some examples, the signal strength may be used to determine the location. However it should be noted that other techniques and data may be used, such as angle of arrival information and/or time of flight information.

In some examples, the object 120 may not be Bluetooth-enabled or may not be paired with the vehicle 100. In this case, the object location may be determined based on a measured difference in the signal strength between two or more antennas 106, or between two or more pairs of antennas 106.

Antennas 106 may be configured to transmit and receive data between themselves, and to determine signals strength values and other metrics associated with the signals. For instance, each antenna 106 may broadcast a signal to the other antennas of vehicle 100, which may receive the signal and determine a signal strength. This signal strength may be monitored over time, and when object 120 is brought nearby or proximate a given antenna, the broadcast signal may bounce off the object in a multipath scenario, causing variations in the signal strength (e.g., increased RSSI between two nearby antennas). The difference in signal strength may be mapped to or correlated with the position of the object 120. And the RSSI values between multiple sets of antennas 106 may be compared and analyzed in order to triangulate or trilaterate a location of the object 120, similar to those methods and techniques described above with respect to a paired Bluetooth-enabled object.

In some examples, processor 110 may be configured to determine the location of the object 120 during operation of the wireless vehicle battery charger 102. For instance, while a charging operation is underway and energy is being actively transferred to the vehicle battery. Alternatively or in addition, processor 110 may be configured to monitor for objects and determine their location prior to a charging operation, or during a temporary pause in the charging operation. For instance, as described below, the vehicle battery charger 102 may be disabled if an object is detected in the charging field. The charger may be disabled for a short period of time (e.g., 30 seconds), and the position of the object may be monitored during this time to determine whether the object remains within the field or is moving out of the field during the temporary pause.

Processor 110 may also be configured to determine the location of the charging field 104, and compare the charging field location to the location of the object. In other words, the processor 110 may be configured to determine whether the object 120 is within the charging field 104. And responsive to this determination, (i.e., where the object is determined to be within charging field 104) the processor 110 may disable the vehicle battery charger 102.

Disabling the charger 102 may include stopping an active or ongoing charging operation. If the vehicle charger is currently operating and receiving energy from the charging pad 130, the processor 110 may disable the charger 102, disable the charging pad 130, or otherwise cause the charging operation to stop. This may include transmitting a signal to the charging pad 130 and/or a computing device coupled to the charging pad 130, such that the charging pad 130 stops providing power to the charger 102.

In some examples, disabling the charger may include preventing the charger from turning on when it is not currently operating. Where the charger 102 is not yet receiving energy, an object entering the charging field 104 may cause the processor 110 to prevent a future charging operation from starting. This may prevent the vehicle from beginning charging when an object is detected in the charging field or is expected to enter the charging field.

In some examples, the processor 110 may be configured to disable the wireless vehicle battery charger 102 for a predetermined time in response to an object being located in the charging field. For instance, when an object is detected in the charging field, the charger 102 may be disabled for 30 seconds (or some other period of time). During that time period, and/or after that time period has elapsed, the processor 110 may determine whether or not the object has exited the charging field. Where it is determined that the object is no longer within the charging field, the processor 110 may responsively enable the wireless vehicle battery charger.

Some of the actions above have been described as being performed responsive to determining that the object is within the charging field (e.g., disabling the charger, preventing a charging operating from beginning, disabling for a predetermined time, etc.). It should be noted that these actions may also be done responsive to determining that an object will enter the charging field in the future, or within a predetermined time (e.g., 5 seconds). For example, the processor 110 may determine that an object is located outside the charging field, and based on a trajectory or movement of the object (determined by successive location determinations over time), determine that the object will enter the charging field within a predetermined time period (e.g., 5 seconds). Based on this determination, the processor 110 may preemptively disable the charger 102, or preemptively prevent a charging operation from beginning.

Figure 4:
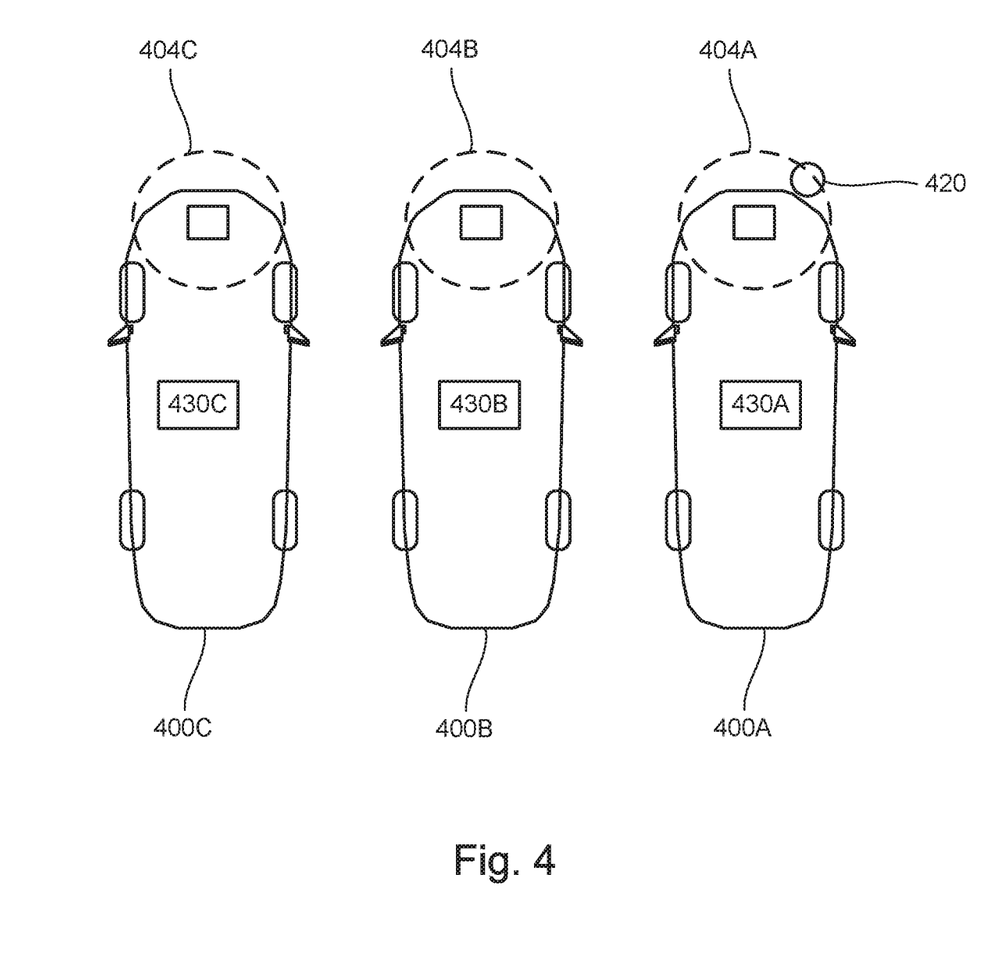
FIG. 4 illustrates a plurality of vehicles in a row according to embodiments of the present disclosure.

Vehicle 100 may also include a communication system 130, configured to transmit and/or receive data with one or more other vehicles and/or infrastructure in the vehicle surroundings. In some examples, vehicle 100 may be one of several vehicles in an area, such as a parking garage. FIG. 4 illustrates three vehicles with corresponding chargers and communication systems.

In this scenario, the processor 110 of vehicle 100 may be configured to receive, via communication system 130, an indication that a nearby vehicle has detected an object in the corresponding charging field, and has disabled a corresponding wireless vehicle battery charger. The nearby vehicle may transmit an indication to vehicle 100, which may in turn responsively disable the wireless vehicle battery charger 102. One scenario in which this may occur is when an object rolls into a first charging field, and continues to move down a line of vehicles/charging fields. Vehicles down the line may preemptively disable wireless charging based on data from the vehicles rather than a detection of the object itself.

Figure 2:
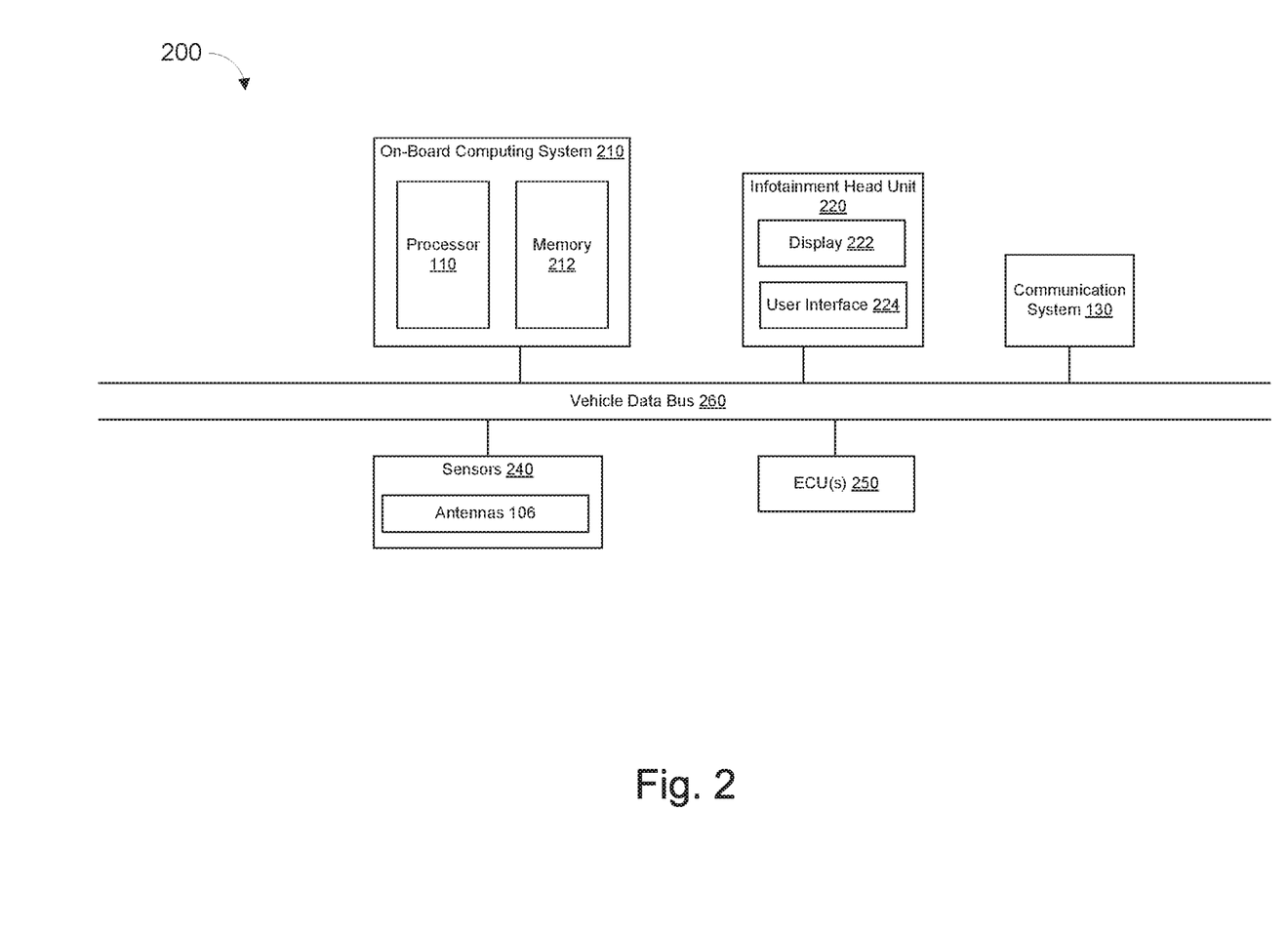
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, communication system 130, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224. User interface 224 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a display 222 of vehicle 100.

Sensors 240 may be arranged in and around the vehicle 100 in any suitable fashion. In the illustrated example, sensors 240 include antennas 106, described with reference to FIG. 1 above. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware.

Vehicle data bus 260 may include one or more data buses that communicatively couple the on-board computing system 210, infotainment head unit 220, communication system 130, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7). In some examples, the CAN bus may be shared with the CAN-FD bus.

Figure 3:
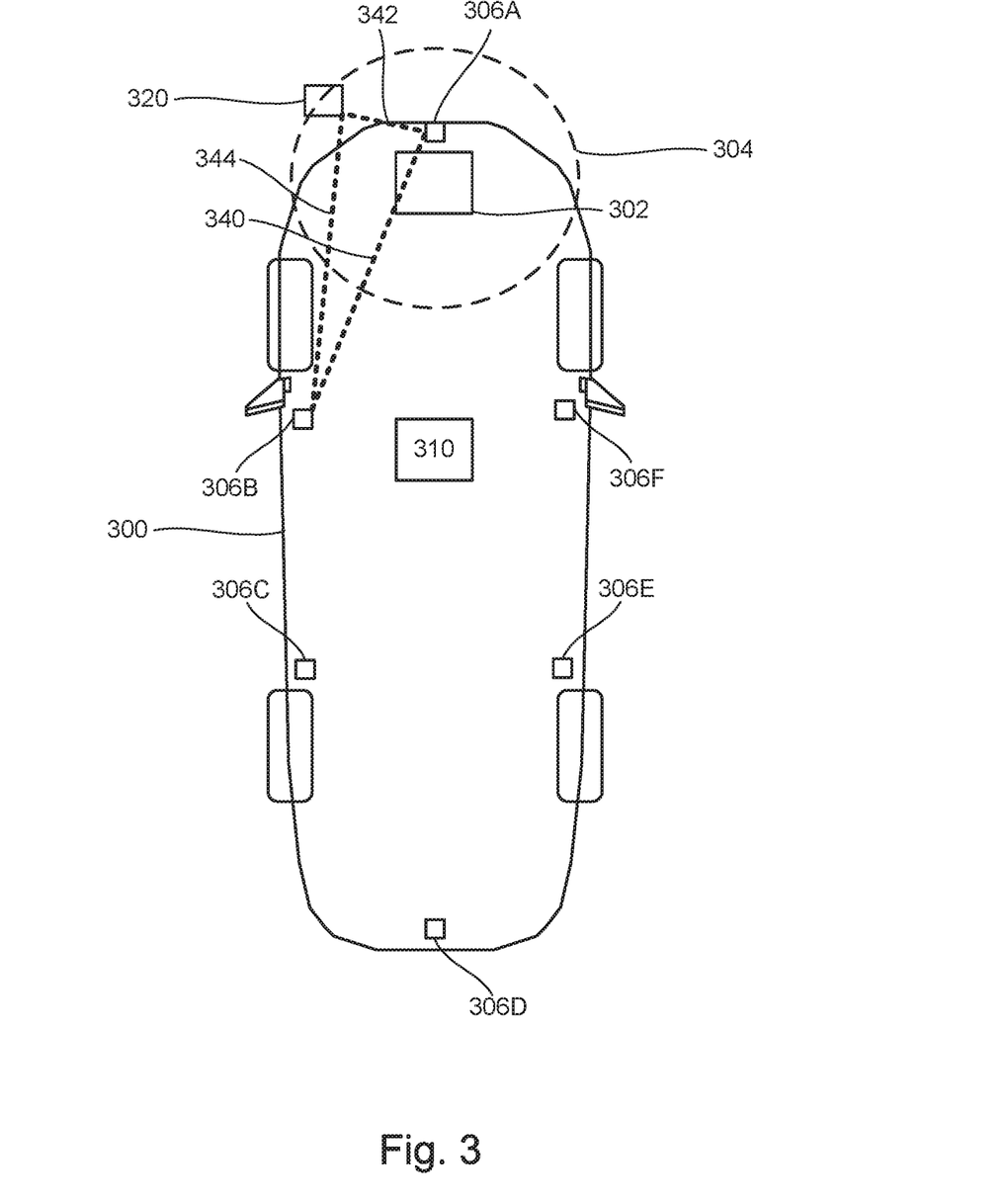
FIG. 3 illustrates an overhead view of a vehicle according to embodiments of the present disclosure.

FIG. 3 illustrates a perspective view of a vehicle 300 according to embodiments of the present disclosure. One or more aspects of vehicle 300 may be similar or identical to those of vehicle 100. For example, charger 302 may be similar or identical to charger 102, and antennas 306A-F may be similar or identical to antennas 106 described with respect to FIG. 1.

FIG. 3 shows a charger 302 within a charging field 304 corresponding to a charging pad (not shown), and an object 320 within the charging field 304. The location of object 320 may be determined in several ways, depending on the nature of the object 320. In a first example, the object 320 is a Bluetooth-enabled device, paired with the vehicle 300. Antennas 306A and 306B may be Bluetooth antennas, and communication paths 342 and 344 between the object 320 and the antennas 306A and 306B respectively may be used to determine the position. In some examples, additional antennas may be used as well.

In other examples, object 320 may not be a Bluetooth-enabled device, or may not be paired with the vehicle 100. In these examples, antennas 306A and 306B may transmit and receive data with each other, shown as data path 340. There may be a signal strength value associated with data path 340, also known as a received signal strength indication (RSSI). When object 320 is moved close to antenna 306A, a second broadcast signal may bounce off the object and reach antenna 306B. The RSSI between antenna 306A and antenna 306B may increase when there is a second path between the antennas. The RSSI between other sets of antennas may also be affected by the object 320 as well. Using the difference in RSSI when there is no object 320 and when there is an object 320 present, the position of the object 320 may be determined.

The determined position may then be compared by processor 310 to the location of the charging field 304. If the object 320 is determined to be inside or within the charging field 304, one or more actions may be taken, such as disabling the charger 302, preventing a future charging operation, and more.

FIG. 4 illustrates an example scenario in which three vehicles 400A, 400B, and 400C are all positioned nearby each other. Vehicles 400A, 400B, and 400C may be similar or identical in some ways to vehicles 100 and 300 described above. Vehicles 400A, 400B, and 400C may include respective communication systems 430A, 430B, and 430C, and have corresponding charging fields 404A, 404B, and 404C.

FIG. 4 illustrates a scenario in which an object 420 is located within a charging field 404A corresponding to vehicle 400A. A processor of vehicle 400A may determine that a charging operation of vehicle 400A should be disabled. The processor may also transmit to vehicles 400B and 400C, via the communication system 430A, an indication of the location of object 420. In some examples, vehicle 400A may also or alternatively transmit an indication that the charging operation of vehicle 400A has been disabled. Vehicles 400B and 400C may then receive the indication via their respective communication systems. Processors of vehicles 400B and 400C may then respectively determine whether or not to disable or prevent respective charging operations, based on the received indication from vehicle 400A.

Figure 5:
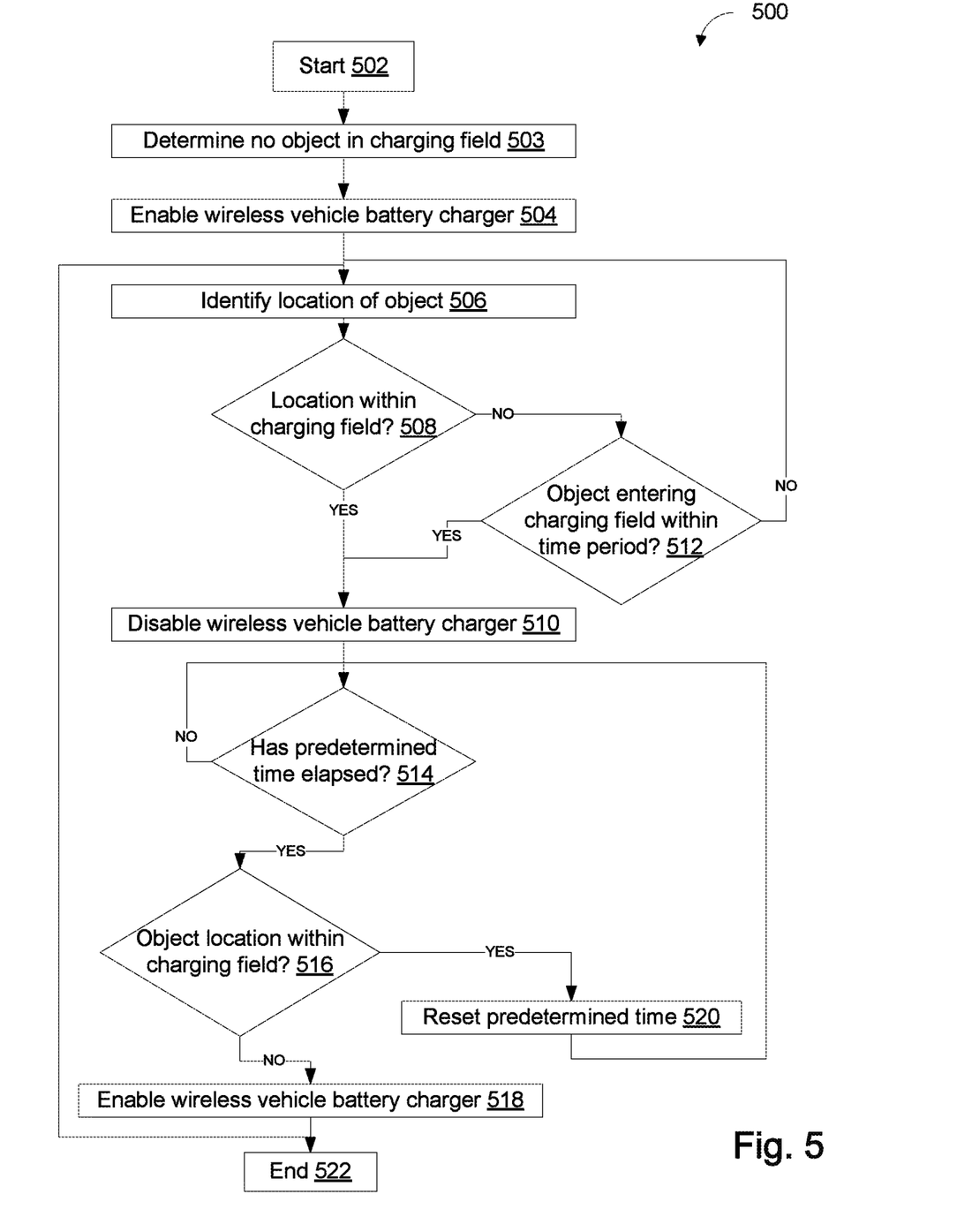
FIG. 5 illustrates a flowchart of an example method according to embodiments of the present disclosure.

FIG. 5 illustrates a flowchart of an example method 500 according to embodiments of the present disclosure. Method 500 may allow a vehicle equipped with a wireless vehicle battery charging system to automatically disable the charger if an object is detected in the charging field. The flowchart of FIG. 5 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-4, some functions of those components will not be described in detail below.

Method 500 may start at block 502. At block 503, method 300 may include determining that there is no object in the charging field. This determination may be done in a manner similar or identical to the manner described above. If there is no object in the charging field, method 500 may include, at block 504, enabling the wireless vehicle battery charger. This may include beginning a wireless charging operation, and transferring power from a charging pad to the vehicle charger within a corresponding charging field.

At block 506, method 500 may include identifying the location of an object. The location of the object may be identified using one or more antennas or sets of antennas, as described above. The object location may then be compared to a location of the charging field. At block 508, method 500 may include determining whether the location of the object is within the charging field.

If the object is not within the charging field, method 500 may include determining whether the object is going to enter the charging field within a predetermined time at block 512. The predetermined time period may be a short time, such as 5 seconds. If the object is not predicted or expected to enter the charging field in the predetermined time, method 500 may continue back to block 506 at which point the object location is again determined and/or monitored.

But if the location of the object is within the charging field, or the object is expected to enter the charging field in the predetermined time period, method 500 may proceed to block 510. At block 510, method 500 may include disabling the wireless vehicle battery charger. This may include stopping an ongoing or active charging operation or preventing a future charging operation.

At block 514, method 500 may include determining whether a predetermined time period has elapsed after the charger has been disabled. For instance, upon detecting an object within the charging field, the charger may be disabled for a short time period, such as 30 seconds. Once the time period has elapsed, method 500 may include determining whether the object is still located within the charging field at block 516.

If the object is still within the charging field, method 500 may include resetting the predetermined time at block 520, and reverting back to block 514 to determine whether the time has elapsed.

If the object is determined to no longer be within the charging field at block 516, method 500 may include enabling the wireless vehicle battery charger at block 518. This may include starting a charging operation, or no longer preventing a charging operation from occurring. Method 500 may then end at block 522.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a wireless vehicle battery charger having a charging field;
   a plurality of Bluetooth antennas; and
   a processor configured to:
      identify a location of an object based on a difference in signal strengths of two or more of the plurality of Bluetooth antennas;
      determine that the object is located outside the charging field;
      determine, based on a trajectory or movement of the object, that the object will enter the charging field within a time period;
      responsive to determining that the object will enter the charging field within the time period, disable the wireless vehicle battery charger;
      determine whether a predetermined time period has elapsed after the wireless vehicle battery charger has been disabled;
      determine, after the predetermined time period has elapsed, that the object is within the charging field;
      reset, based on the determination that the object is within the charging field, the predetermined time period;
      determine, after the reset predetermined time period has elapsed, that the object is no longer within the charging field; and
      responsively enable the wireless vehicle battery charger.

2. The vehicle of claim 1, wherein the processor is further configured to identify the location of the object during operation of the wireless vehicle battery charger.

3. The vehicle of claim 1, wherein identifying the location of the object based on the difference in signal strengths between the two or more of the plurality of Bluetooth antennas comprises:
   determining a first signal strength associated with a first Bluetooth antenna;
   determining a second signal strength associated with a second Bluetooth antenna;
   determining that the first signal strength is stronger than the second signal strength; and
   determining that the object is closer to the first Bluetooth antenna than the second Bluetooth antenna.

4. The vehicle of claim 1, wherein the object comprises a Bluetooth enabled device paired to the vehicle, and wherein identifying the location of the object comprises identifying the location based on a pairing of the object to the vehicle.

5. The vehicle of claim 1, wherein the processor is further configured to disable the wireless vehicle battery charger by stopping an active charging operation.

6. The vehicle of claim 1, wherein the processor is further configured to disable the wireless vehicle battery charger by preventing a future charging operation from occurring.

7. The vehicle of claim 1, further comprising a communication system, wherein the processor is further configured to:
    receive, via the communication system, an indication that a nearby vehicle has disabled a corresponding wireless vehicle battery charger; and
    responsively disable the wireless vehicle battery charger.

8. A method of wireless vehicle battery charging comprising:
    identifying, by a processor of a vehicle comprising a wireless vehicle battery charger and a plurality of Bluetooth antennas, a location of an object based on a difference in signal strengths of two or more of the plurality of Bluetooth antennas;
    determining that the object is located outside a charging field;
    determining, based on a trajectory or movement of the object, that the object will enter the charging field within a time period;
    responsive to determining that the object will enter the charging field within the time period, disabling the wireless vehicle battery charger;
    determining whether a predetermined time period has elapsed after the wireless vehicle battery charger has been disabled;
    determining, after the predetermined time period has elapsed, that the object is within the charging field;
    resetting, based on the determination that the object is within the charging field, the predetermined time period;
    determining, after the reset predetermined time period has elapsed, that the object is no longer within the charging field; and
    responsively enabling the wireless vehicle battery charger.

9. The method of claim 8, further comprising:
    identifying the location of the object during operation of the wireless vehicle battery charger.

10. The method of claim 8, wherein identifying the location of the object based on the difference in signal strengths between the two or more of the plurality of Bluetooth antennas comprises:
    determining a first signal strength associated with a first Bluetooth antenna;
    determining a second signal strength associated with a second Bluetooth antenna;
    determining that the first signal strength is stronger than the second signal strength; and
    determining that the object is closer to the first Bluetooth antenna than the second Bluetooth antenna.

11. The method of claim 8, wherein the object comprises a Bluetooth enabled device paired to the vehicle, and wherein identifying the location of the object comprises identifying the location based on a pairing of the object to the vehicle.

12. The method of claim 8, further comprising disabling the wireless vehicle battery charger by stopping an active charging operation.

13. The method of claim 8, further comprising disabling the wireless vehicle battery charger by preventing a future charging operation from occurring.

14. The method of claim 8, wherein the vehicle further comprises a communication system, the method further comprising:
    receiving, via the communication system, an indication that a nearby vehicle has disabled a corresponding wireless vehicle battery charger; and
    responsively disabling the wireless vehicle battery charger.

* * * * *